Figure 1:
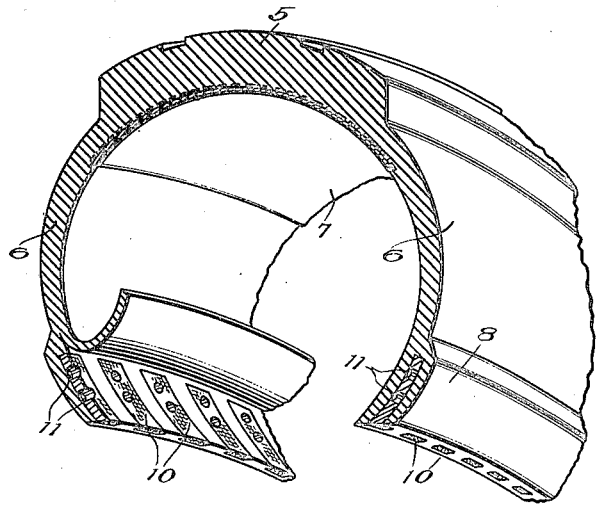

Feb. 13, 1923.

B. J. MULLIKIN

PNEUMATIC TIRE

Filed Oct. 4, 1922

Patented Feb. 13, 1923.

1,445,540

UNITED STATES PATENT OFFICE.

BROOKS JAMISON MULLIKIN, OF ST. LOUIS, MISSOURI.

PNEUMATIC TIRE.

Application filed October 4, 1922. Serial No. 592,327.

*To all whom it may concern:*

Be it known that I, BROOKS J. MULLIKIN, a citizen of the United States, and a resident of St. Louis, Missouri, have invented a new and Improved Pneumatic Tire, of which the following is a full, clear, and exact description.

This invention relates to improvements in pneumatic tires, and has particular reference to an overshoe therefor.

An object of the invention is to provide an improved overshoe wherein overheating of the same is prevented by dissipating or expelling the heat from the overshoe by the action of the same as it passes over the ground.

Another object is the provision of an overshoe which may be readily secured to a tire casing by vulcanizing or otherwise, and which when in operative position will afford an effective protection for the casing and pneumatic inner tube mounted therein.

Another object is to provide an overshoe, the side walls of which are thickened and made of live rubber to add strength to the tire at and directly above the rim of wheel and also to act as a cushion for the casing against the rim of wheel when the tire is deflated or flat preventing excess wear of fabric and rim cuts which eventually cause blowouts.

The above and other objects will appear more clearly from the following detail description, when taken in connection with the accompanying drawing, which illustrates a preferred embodiment of the inventive idea.

In the drawing—

Figure 2:
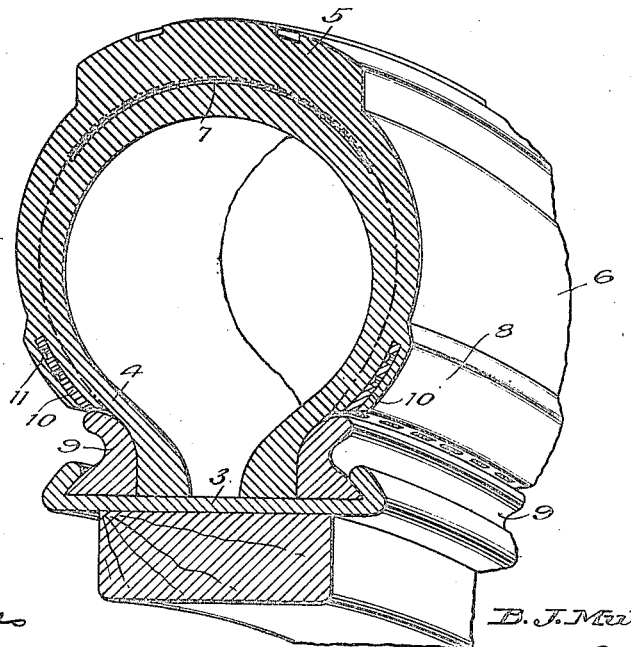

Figure 1 is a sectionalized perspective view of the overshoe showing a portion thereof cut away and bent back to illustrate the invention; and Figure 2 is a similar view of the overshoe in position on a tire casing.

Referring more particularly to the drawing, the tire is shown as comprising the usual rim 3, upon which is mounted in the ordinary manner a tire casing 4 designed to receive a pneumatic inner tube (not shown).

The overshoe which comprises the essential features of the invention is shown as consisting of a tread portion 5 and side walls 6, the tread portion being of greater thickness than the side walls to provide an effective wearing surface. Secured to the inner surface of the shoe at a point contiguous to the tread portion 5, are soft rubber cushions and fabric breaker strips 7 which are employed in the manufacture of various makes of tires.

The free edges of the side walls 6 of the shoe are preferably enlarged or thickened, as indicated at 8, and these enlarged portions are made of live rubber. In applying the overshoe to the casing 4 the same may be vulcanized thereto and when in position thereon the free edges of the side walls 6 will lie adjacent the securing members 9 which are utilized to fasten the tire casing 4 to the rim 3.

The invention contemplates the provision of means for preventing excessive heating of the overshoe, which is known to be a common fault in devices of this nature, and this means is made effective by the vibrations caused by the motion of the tire when in use so that the means will have the effect of dissipating or expelling the heat from the overshoe when the tire is distorted or flattened at the point of contact with the ground and of drawing cool air into the overshoe when the tire again assumes its normal contour. To accomplish this purpose, the enlarged portions 8 of the side walls 6 of the overshoe have embedded therein a plurality of spaced strips of fabric 10, preferably of a comparatively loose weave to permit of a certain amount of air passing therethrough. The strips when embedded in the portions 8 between the inner and outer surfaces thereof extend transversely to the peripheral edges of said portions and each strip is provided with a plurality of transverse openings 11 which have the effect of forming passages through which air will pass when the strips are in position. The outer raw edges of the strips 10 terminate along the inner edge of the enlarged portions 8 so that when the tire is distorted or flattened at any particular point by contact with the ground, the positions assumed by the enlarged portions 8 will, by reason of the pressure exerted thereon by contact of the tread portion 5 with the ground and by the vibrations caused by the motion of the tire, have the effect of expanding and contracting the live rubber portion 8 so that the same acts as a bellows to expel the heated air through the loosely woven fabric and openings 11. When the shoe again assumes its normal position a contraction of the portions 8 takes place and as these portions contract the openings 11 in the fabric strips 10 have the effect of drawing cool air through said loosely woven fabric into the portions 8 with the result that the temperature of these portions will be maintained at a substantially constant degree and be prevented from overheating.

It is obvious that when the tread portion 5 becomes worn to such an extent that the casing 4 is exposed, the old rubber of the overshoe may be removed and a new overshoe secured to the casing. It is also apparent that the overshoe may be made separate and of various sizes to fit different sizes and makes of tires and can be applied to old casings as well as new ones.

What is claimed is:

1. An overshoe for tire casings, comprising a tread portion and side walls, the free edges of the side walls being enlarged and of live rubber, and a plurality of spaced strips of loosely woven fabric embedded in said enlarged portions and provided with openings for the passage of air therethrough.

2. An overshoe for tire casings, comprising a tread portion and side walls, the free edges of the side walls being enlarged and of live rubber, and a plurality of strips embedded in said enlarged portions in spaced relation to each other and extending transversely with respect to the peripheral edges of said portions, said strips being provided with openings for the passage of air therethrough.

3. An overshoe for tire casings, including side walls, and inserts of porous material embedded within said side walls and through which air is permitted to pass.

4. An overshoe for tire casings, including side walls, and inserts of a different material from said side walls embeded therein and through which air is permitted to pass.

BROOKS JAMISON MULLIKIN.